United States Patent [19]

Hilbert et al.

[11] 4,067,786

[45] Jan. 10, 1978

[54] METHOD AND APPARATUS FOR REFORMING SOLID ELECTROLYTIC CAPACITORS

[75] Inventors: Ferdinand Hilbert, Heidenheim; Hans Wolscheck, Hermaringen, both of Germany

[73] Assignee: Siemens Aktiengesellschaft, Berlin & Munich, Germany

[21] Appl. No.: 731,431

[22] Filed: Oct. 12, 1976

[30] Foreign Application Priority Data

Oct. 24, 1975 Germany .............................. 2547734

[51] Int. Cl.² ...................... C25D 11/02; C25D 17/00
[52] U.S. Cl. ................................. 204/56 R; 204/288; 204/289; 29/570
[58] Field of Search ............. 204/56 R, 286, 288–289, 204/290 F, 297; 29/570

[56] References Cited

U.S. PATENT DOCUMENTS 3,953,316  4/1976  Baker .................................. 204/286

Primary Examiner—R. L. Andrews
Attorney, Agent, or Firm—Hill, Gross, Simpson, Van Santen, Steadman, Chiara & Simpson

[57] ABSTRACT

For achieving stable electrical values, solid electrolytic capacitors must be reformed. To that end they were previously connected to the voltage required for the reforming and were simultaneously subjected to a raised temperature. A barrier resistance was necessary, for that purpose, for each individual capacitor. In the new process, the capacitors are placed on a metal plate which is covered with an elastic conductive plastic. As a result, the need for an individual barrier resistance for each individual capacitor is obviated.

10 Claims, 2 Drawing Figures

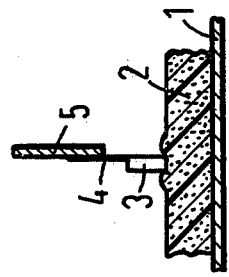
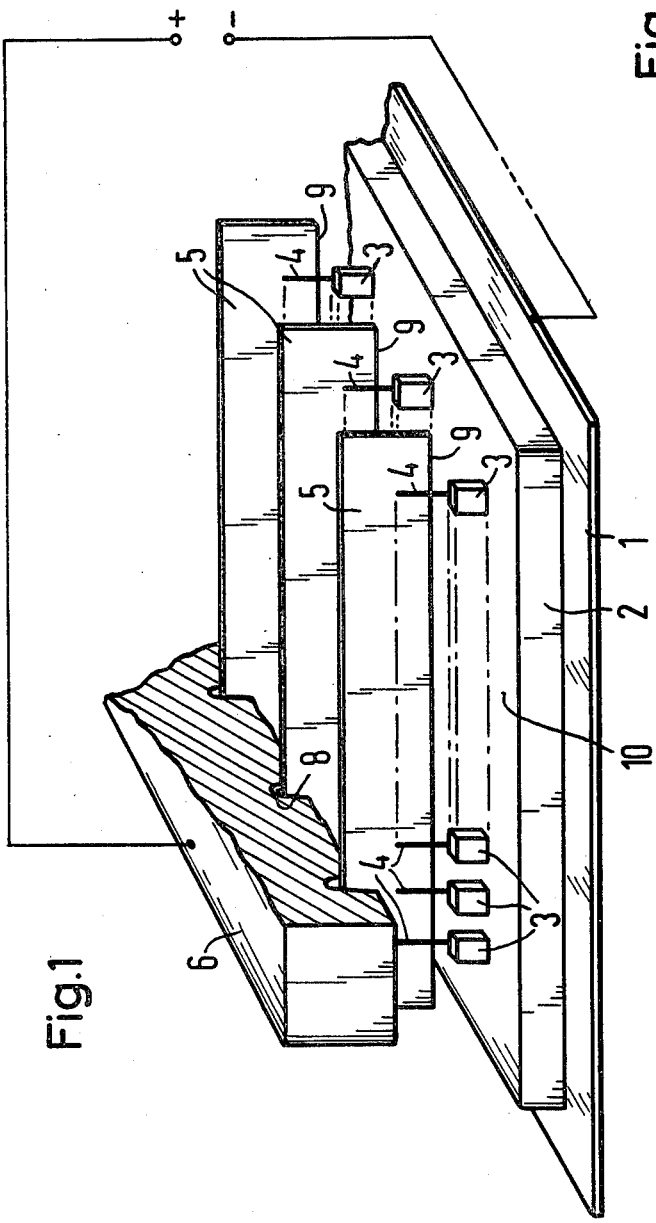

METHOD AND APPARATUS FOR REFORMING SOLID ELECTROLYTIC CAPACITORS

BACKGROUND OF THE INVENTION

The sintered anodes of solid electrolytic capacitors consist of a valve metal, tantalum being principally employed. There are, however, other valve metals, such as zircon or niobium, for examples, which are used in solid electrolytic capacitors. The semi-conducting electrolyte generally employed is a manganese dioxide coating which is applied by dipping the sintered body in a manganese nitrate bath followed by subsequent pyrolysis of this coating. This procedural sequence is generally repeated a few times for a given body. It is also possible to use other semi-conducting metal oxides, such as lead dioxide, for example, as an electrolyte. A thin oxide coating of the valve metal, which is produced on the valve metal in a forming process, serves as a dielectric layer in solid electrolytic capacitors. Forming electrolytes are employed for the forming process, a voltage being applied to the sintered body, so that an anodic oxidation of the valve metal is effected.

In the application of the semi-conducting electrolyte, and also of the cathode contact layer (generally a graphite coating with a layer of conducting silver enamel thereon), it is possible for the oxide layer acting as dielectric layer to be destroyed at some points. Consequently, in order to achieve stable electrical values for solid electrolytic capacitors, such capacitors are reformed in the final phase of their manufacture. In reforming, such capacitors are subjected to a voltage across an individual barrier resistance for a relatively long period of time (about 1 day) at an elevated temperature (about 85° to 125° C). This reforming method is, however, very expensive, since a barrier resistance is needed for each individual capacitor. Moreover, the contact elements are subjected to a high stress at temperatures ranging from about 85° to 125° C which are necessary for the forming and aging. Also, in order to ensure satisfactory contacting, contact elements must be serviced or exchanged at short intervals with a high resultant cost.

BRIEF SUMMARY OF THE INVENTION

In one aspect, this invention relates to a process for the reforming of solid electrolytic capacitors. Such capacitors are of the type which employ a sintered anode that is covered with a dielectrically active oxide coating and which have as a counter electrode a semi-conducting electrolyte with a contact means thereon.

In another aspect, this invention relates to reforming apparatus useful in the practice of such reforming process.

Another object of this invention to provide a process for the reforming of solid electrolytic capacitors in which the above-mentioned difficulties are circumvented.

Another object is to provide an improved, simpler, more reliable, and cheaper contacting technique through which a more rational production of solid electrolytic capacitors is ensured.

Another object is to provide a reforming apparatus adapted for the application of such an improved reforming process.

In the case of such process for reforming solid electrolytic capacitors, such object is achieved in that such capacitor bodies with anode conductor are contacted equidistantly on retainer plates. A plurality of such retainer plates so equipped are suspended in a forming frame, and the forming frame is placed on a metal plate or base having upon it a coating of a conductive synthetic elastic plastic material. The reforming of such so contacted capacitors is then carried out.

The reforming apparatus of this invention characteristically employs a metal plate or base connected as cathode to each such capacitor. A coating of a conductive elastic plastic is disposed on such plate or base. Preferably, such metal plate or base is comprised of a silvered copper sheet, and preferably the plastic coating ranges from about 5 to 10 mm in thickness.

These and other objects, aims, purposes, features and the like will be apparent to those skilled in the art from the associated specification taken with the accompanying drawings.

BRIEF DESCRIPTION OF THE DRAWINGS

In the drawings:

FIG. 1 is a fragmentary perspective view of one embodiment of apparatus for reforming in accord with the present invention; and FIG. 2 is a fragmentary transverse section view through a portion of the apparatus of FIG. 1.

DETAILED DESCRIPTION

FIGS. 1 and 2 show reforming apparatus in accordance with the present invention which employs a silver coated copper plate 1 having a layer 2 on the upper face thereof which is comprised of a conductive elastic plastic. The composition of this layer 2 is so selected that it withstands the temperatures employed in reforming and condenser ageing, that is, layer 2 is thermally stable up to at least about 125° C. Further, this composition is also elastic so that the individual capacitors being reformed are not mechanically loaded. Suitable compositions include silicone resins, polyester resins, and the like, to which certain particulate substances, such as, for example, graphite, are added in order to produce the desired conductivity in a layer 2. Solid electrolytic capacitors 3, each constructed with an anode lead 4 centrally located upon its respective front faces are positioned on retaining plates 5. The capacitors 3 are similar to one another in structure and properties, are all of the solid electrolytic type and are finished up in their respective encasings with a tantalum inter-anode and an electrolyte of manganese dioxide. A graphite layer with a coating of a conductive silver enamel is disposed on the maganese dioxide layer and serves as cathode conductor. The individual retaining plates 5 are suspended in a metal holding frame 6, not detailed in the FIG. 5. Preferably, a reforming apparatus is so constructed that it contains about 40 individual retaining plates 5. Each plate is preferably large enough to accomodate about 60 capacitors for reforming at the same time. In the preferred practice of the process of this invention, a controllable, desirable contact pressure is provided through the loading resulting from the total weight of the individual condenser bodies 3, the individual retaining plates 5 and the holding frame 6. In this way, a desired particular barrier resistance is automatically obtained for each individual capacitor 3 across the layer 2 of conductive elastic plastic, according to the choice of the specific resistance and the thickness of the layer 2. The plastic layer 2 preferably has a thickness of from about 5 to 10 mm.

For a reforming operation, the reforming apparatus with the capacitors 3 loaded as described on it is pushed into a reforming oven (not shown) where the whole arrangement remains for a relatively long time at a desired selected high temperature. The individual retaining plates 5 are here interconnected electrically as an anode, and the metal plate 1 is connected as a cathode. Voltage and temperature are set in accordance with the nominal data of the capacitors 3 in any given reforming operation.

FIG. 2 shows an individual retaining plate 5 on which a capacitor body 3 is contacted by means of its anode conductor 4. The capacitor is located on the conductive elastic plastic layer 2 which in turn lies upon the metal plate 1 serving as cathode.

An advantage associated with the use of the process of the present invention is that reforming and ageing of solid electrolytic capacitors can be carried out on a forming frame employed for reforming with the production of the oxide layer serving as dielectric layer on the valve metal.

In one preferred aspect, the present invention involves apparatus adapted for the reforming of solid electrolytic capacitors. This apparatus utilizes a metal base plate having a generally flat top face. A layer of electrically conductive elastic plastic is located on said top face and thus such layer has an exposed outer face 10. A plurality of elongated, flattened metal bars is provided, each bar being of substantially equal size and composition relative to one another. These bars are located in generally spaced, parallel relationship relative to one another. A longitudinal side edge of each bar is positionable in generally equally spaced relationship to the outer face of such layer. A frame means is provided supporting and maintaining said bars in such relationships relative to each other and to such layer's outer face. Means including lead members is provided for applying a direct, uniform potential difference between said base plate as cathode and all of said bars as anode.

The leads of the individual capacitors can be connected to their associated bars by any convenient means, including soldering. The individual bars are preferably demountably secured to the frame means. For example, the frame means 6 can comprise a plate member having tapered slots 8 defined therein in spaced parallel relationship to one another. The slot tapers can be of the so-called Morris type wherein tapers range from about 2° to 7°. These slots effectively serve to temporarily clamp the individual plates or bars 5 during a reforming operation in accord with the teachings of this invention.

In such a preferred apparatus, a plurality of similar solid electrolytic capacitors 3 are positioned in longitudinally spaced, generally parallel relationship to one another along the side edge 9 of each bar 5.

Each such plurality of capacitors 3 further is located generally between such side edge 9 and said outer face, each individual capacitor 3 having an anode lead conductor 4 extending therefrom and having a cathode conductor (not detailed) defined on a side thereof opposed to that from which said anode lead conductor 4 extends. Each capacitor has its anode lead conductor 4 detachably connected electrically and fixedly to its associated bar 5, and further having its said cathode conductor in electrical contact with an adjacent portion of said outer face 10. The combination of frame means 6, bars 5 and capacitors 3 coact to provide a desired amount of applied contact pressure between each of said capacitors 3 and layer 2.

In another preferred aspect the present invention involves a process for reforming simultaneously a plurality of similar solid electrolytic capacitors 3, each such capacitor 3 having an anode lead conductor 4 extending therefrom and further having a cathode conductor defined on a side thereof opposed to that from which said anode lead extends. This process comprises a plurality of steps.

In one step, one detachably connects electrically and physically the anode lead conductor 4 of each one of a series of said capacitors 3 to a longitudinal side edge 9 of each of a plurality of similar flattened, elongated metal bars 5 with said capacitors 3 being generally in spaced, parallel relationship to each other along each said bar 5 and extending outwardly laterally from such side edge 9 thereof.

One locates, in another step, each said bar 5 in spaced, parallel relationship to the others thereof in such bar plurality with individual capacitors 3 projecting outwardly therefrom in a common direction.

In another step, with said bars 5 in said location, one contacts said cathode conductor of each one of said capacitors against the initially generally flattened surface 10 of a layer 2 of electrically conductive elastic plastic while simultaneously contacting the opposed surface of said layer 2 against the flattened surface of a metal base plate 1.

One pressurizes each of said bars 5 simultaneously and equally to provide a desired amount of contact pressure between said layer 2 and said capacitors 3.

In another step, one applies a desired direct voltage across said base plate 1 as cathode and each of said bars 5 as anode for time interval sufficient to reform all of said capacitors.

Another advantage is that the setting of any desired barrier resistance is permitted through a suitable selection of the specific conductivity of the plastic employed. Since there are plastics that are resistant up to high temperatures, in contrast to metallic contact components, it is only infrequently necessary to change such, and such a change or replacement of the plastic can be carried out in a simple manner, since it only lies upon the metal plate.

Another advantage is that through the integration of the barrier resistance in the contact material, a better utilization of the space available in the reforming apparatus results. With apparatus of the present invention it is possible to insert about three times as many capacitors in one apparatus embodiment of this invention compared to prior art reforming apparatus of approximately similar volume (size).

Another advantage is that through an appropriate selection of an elastic contact material in accordance with the teachings of this invention, a very gentle contacting of such solid electrolytic capacitors results, so that in practice mechanical stresses on the capacitors do not occur during a reforming operation.

Another advantage is that, because the capacitors remain on a reforming apparatus of this invention in a definite location, an incorrect polarity during reforming is absolutely excluded, and a desired contacting during reforming is completely guaranteed, and cannot be interrupted in the case of individual capacitors, contrary to the situation in the prior art technique for reforming of such capacitors. The confusion and mixing up of individual loose capacitors during the manufacturing process can no longer occur, since the capacitors can remain in the same manufacturing frames from the start to the finish of their manufacture.

With the process of this invention and with the reforming apparatus of this invention, considerable reductions are achieved in labor and investment costs for reforming compared to the prior art. The teachings of this invention is particularly well suited to flow production techniques.

The claims are:

1. A method for the reforming of a plurality of solid electrolytic capacitors, said capacitors each being characterized by having a sintered anode which is covered with a dielectrically active oxide coating, and which is associated with an external anode conductor and by having as counter electrode a semi-conducting electrolyte with a contact means thereon, said method comprising locating a plurality of such capacitors in generally spaced parallel relationship to one another with the anode conductor of each capacitor being contacted a retaining plate, suspending said plate in a holding frame, mounting said frame over a metal base plate having thereagainst a layer of a conductive elastic plastic with each such capacitor being in electrical contact with said layer, and reforming said capacitors by applying a direct voltage across said base plate and each of said retaining plates with said base plate being connected as cathode.

2. A reforming apparatus adapted for the practice of the process of claim 1, said apparatus having a metal base plate connectable as cathode and having a layer of a conductive elastic plastic located thereon.

3. The reforming device of claim 2 further characterized by having said metal base plate be a silvered copper plate.

4. The reforming device of claim 3 further characterized by having said layer be from about 5 to 10 mm thick.

5. Apparatus adapted for the reforming of solid electrolytic capacitors, said apparatus comprising
   A. a metal base plate constituting cathode means having a generally flat top face,
   B. a layer of electrically conductive elastic plastic located on said top face and having an exposed outer face,
   C. a plurality of elongated, flattened metal bars constituting anode means of substantially equal size and composition relative to one another located in generally spaced, parallel relationship relative to one another with a longitudinal side edge of each bar being positionable in generally equally spaced relationship to said outer face,
   D. frame means supporting and maintaining said bars in said relationships relative to each other and to said outer face, and
   E. means including lead members for applying a direct, uniform potential difference between said base plate as cathode and all of said bars as anode each individual said capacitor having an anode lead conductor extending therefrom and having a cathode conductor defined on a side thereof opposed to that from which said anode lead conductor extends, each said capacitor having its said anode lead conductor detachably connected electrically and physically to its associated said bar, and further having its said cathode conductor in electrical contact with an adjacent portion of said outer face, the combination of said frame means, said bars and said capacitors coacting to provide a desired amount of applied contact pressure between each of said capacitors and said layer.

6. The apparatus of claim 5 wherein a plurality of similar solid electrolytic capacitors are positioned in longitudinally spaced, generally parallel relationship to one another along the side edge of each said bar, each such plurality further being located generally between such side edge and said outer face.

7. A process for reforming simultaneously a plurality of similar solid electrolytic capacitors, each such capacitor having an anode lead conductor extending therefrom and further having a cathode conductor defined on a side thereof opposed to that from which said anode lead extends, said process comprising the steps of
   A. detachably connecting electrically and physically said anode lead conductor of each one of a series of said capacitors to a longitudinal side edge of each of a plurality of similar flattened, elongated metal bars, with said capacitors being generally in spaced, parallel relationship to each other along each said bar and extending outwardly laterally from such side edge thereof,
   B. locating each said bar in spaced parallel relationship to the others thereof with said capacitors projecting outwardly therefrom in a common direction,
   C. contacting with said bars in said location said cathode conductor of each one of said capacitors against the initially generally flattened surface of a layer of electrically conductive elastic plastic while simultaneously contacting the opposed surface of said layer against the flattened surface of a metal base plate,
   D. pressurizing each of said bars simultaneously and equally to provide a desired amount of contact pressure between said layer and said capacitors, and
   E. applying a desired direct voltage across said base plate as cathode and each of said bars as anode for time interval sufficient to reform all of said capacitors.

8. The reforming apparatus of claim 5 wherein said base plate is a silvered copper member.

9. The reforming apparatus of claim 5 wherein said layer ranges from 5 to 10 millimeters in thickness.

10. The process of claim 7 wherein after said reforming said capacitors are separated from said bars.

* * * * *